(12) United States Patent
Chan

(10) Patent No.: US 8,351,150 B2
(45) Date of Patent: Jan. 8, 2013

(54) ISOLATING UNSTABLE AIR PRESSURE IN A HARD DISK DRIVE (HDD)

(75) Inventor: Andre S. Chan, Milpitas, CA (US)

(73) Assignee: HGST, Netherlands B.V., Amsterdam (NL)

( * ) Notice: Subject to any disclaimer, the term of this patent is extended or adjusted under 35 U.S.C. 154(b) by 251 days.

(21) Appl. No.: 12/629,573

(22) Filed: Dec. 2, 2009

(65) Prior Publication Data

US 2011/0128650 A1    Jun. 2, 2011

(51) Int. Cl.
*G11B 33/14* (2006.01)
*G11B 25/04* (2006.01)

(52) U.S. Cl. .................. 360/99.22; 360/97.13

(58) Field of Classification Search .... 360/97.02–97.04, 360/97.12, 97.13, 97.14, 99.21, 99.22
See application file for complete search history.

(56) References Cited

U.S. PATENT DOCUMENTS

| | | | |
|---|---|---|---|
| 4,214,286 A | 7/1980 | Ragle et al. | |
| 5,021,905 A | 6/1991 | Sleger | |
| 5,404,636 A | 4/1995 | Stefansky et al. | |
| 5,541,791 A * | 7/1996 | Yamasaki et al. | 360/256.1 |
| 5,546,250 A | 8/1996 | Diel | |
| 5,568,341 A * | 10/1996 | Shikano | 360/97.02 |
| 5,631,787 A | 5/1997 | Huang et al. | |
| 6,052,255 A * | 4/2000 | Kawabe et al. | 360/97.02 |
| 6,175,469 B1 * | 1/2001 | Ahmad et al. | 360/97.02 |
| 6,369,978 B1 * | 4/2002 | Shimizu et al. | 360/97.03 |
| 6,487,038 B1 * | 11/2002 | Izumi et al. | 360/97.02 |
| 6,631,049 B2 * | 10/2003 | Satoh et al. | 360/97.02 |
| 6,657,812 B2 * | 12/2003 | Serizawa et al. | 360/97.02 |
| 6,961,211 B2 | 11/2005 | Takeda | |
| 7,301,725 B2 | 11/2007 | Kim et al. | |
| 7,474,500 B2 | 1/2009 | Kim | |
| 7,522,375 B2 * | 4/2009 | Tsuda et al. | 360/97.02 |
| 2001/0030830 A1 * | 10/2001 | Takaike | 360/97.02 |
| 2002/0030923 A1 * | 3/2002 | Satoh et al. | 360/97.02 |
| 2002/0039251 A1 * | 4/2002 | Imai et al. | 360/97.02 |
| 2002/0044376 A1 * | 4/2002 | Serizawa et al. | 360/97.02 |
| 2002/0093757 A1 * | 7/2002 | Daniel | 360/97.01 |
| 2002/0135932 A1 * | 9/2002 | Daniel et al. | 360/97.02 |
| 2002/0181149 A1 * | 12/2002 | Shimizu et al. | 360/97.03 |
| 2003/0197974 A1 * | 10/2003 | Hong et al. | 360/97.02 |
| 2004/0070867 A1 * | 4/2004 | Kudo et al. | 360/97.01 |
| 2005/0041329 A1 * | 2/2005 | Chan et al. | 360/97.02 |
| 2007/0188914 A1 * | 8/2007 | Gross | 360/97.02 |
| 2008/0316640 A1 * | 12/2008 | Chan et al. | 360/97.02 |
| 2009/0002882 A1 * | 1/2009 | Yoshikawa et al. | 360/97.02 |

OTHER PUBLICATIONS

Heo, et al., "Reducing Disk Flutter by Improving Aerodynamic Design of Base Castings", *IEEE*,(2000),1-1.

* cited by examiner

*Primary Examiner* — Craig A. Renner
*Assistant Examiner* — Adam B Dravininkas

(57) ABSTRACT

A hard disk drive (HDD) includes a base plate where the base plate includes a disk housing, at least one disk located within a disk shroud in the base plate, a drive cover configured to cover the at least one said disk within said base plate and a reservoir between the base plate and the drive cover and the reservoir is proximate along a periphery of the at least one disk. The HDD also includes a reservoir seal configured to isolate unstable air pressure in the reservoir from the at least one disk.

15 Claims, 4 Drawing Sheets

ISOLATING UNSTABLE AIR PRESSURE IN A HARD DISK DRIVE (HDD)

FIELD

Embodiments of the present technology relates generally to the field of hard disk drives.

BACKGROUND

Typically in a hard disk drive (HDD) there is a cavity between a base and a cover. Unstable air flow can enter the cavity and subsequently migrate to the region of the disks. The unstable air flow migrates through a passage way between the cavity and the disk region and causes disk vibrations. Moreover, unstable air pressure can be constantly collected and pumped into the cavity which causes a decrease in bypass efficiency.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

The rotation of disks in an HDD causes airflow within the HDD. As a result, the turbulence in the airflow can cause the disks to vibrate and negatively affect HDD performance. It is thus desirable to extract flow momentum and energy from the disk pack in order to reduce the flow induced vibration. One such system is known in the prior art as bypass architecture, whereby the airflow is directed away from the disks and circulated around the actuator mechanism before finally returned back to the disks. However, in the process of routing the airflow through the bypass system, it is possible to inadvertently create a region that holds unstable air pressure in the area near the disk stack. This region can act as a reservoir in feeding the disk pack with undesirable turbulence that can be difficult to control.

Figure 1:
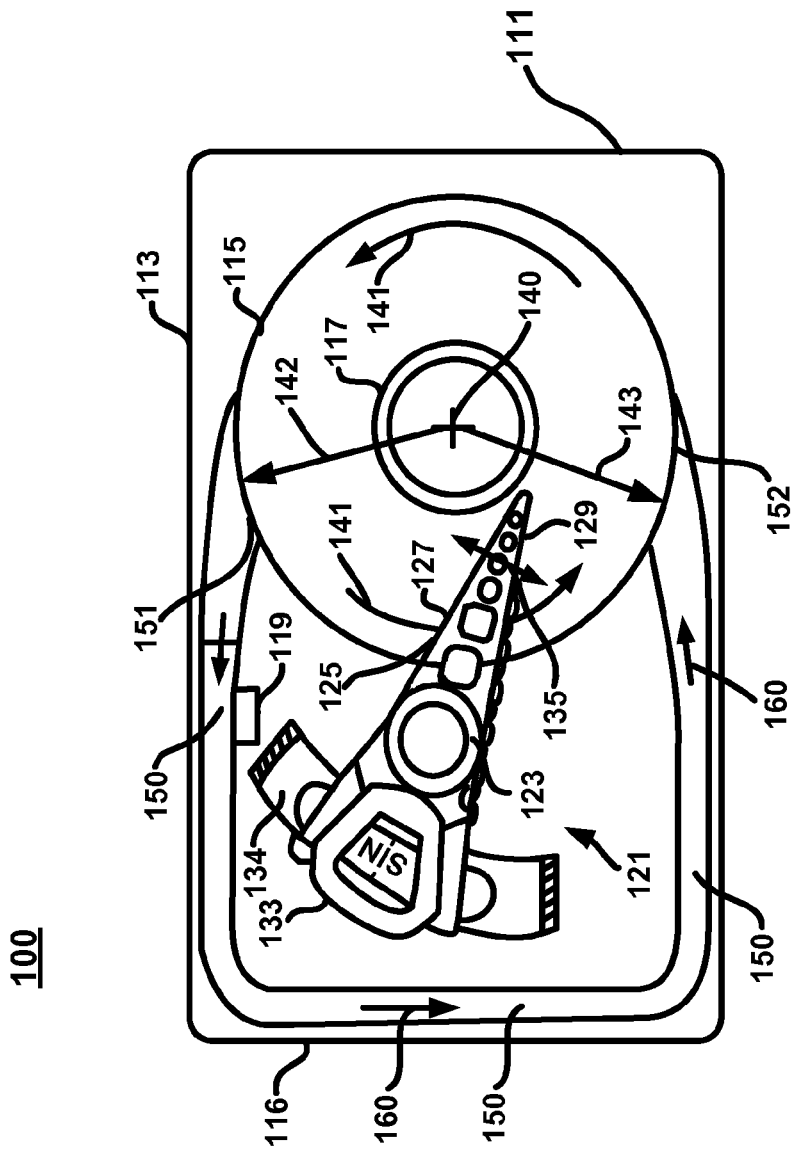
FIG. 1 illustrates an example of a HDD, in accordance with an embodiment of the present invention.

With reference now to FIG. 1, a schematic drawing of one embodiment of an information storage system 100 comprising a magnetic hard disk drive (HDD) 111 for a computer system is shown. Drive 111 has an outer housing or base 113 containing a disk pack having at least one media or magnetic disk 115. The disk or disks 115 are rotated (see arrows 141) by a spindle motor assembly having a central drive hub 117. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly (HGA) is the head and the slider 129, which are mounted on suspension 127. The slider 129 is usually bonded to the end of suspension 127.

Suspensions 127 have a spring-like quality, which biases or urges the air bearing surface of the slider 129 against the disk 115 to cause the slider 129 to fly at a precise distance from the disk. A voice coil 133 free to move within a conventional voice coil motor magnet assembly 134 is also mounted to arms 125 opposite the head gimbal assemblies. Movement of the actuator 121 (indicated by arrow 135) by controller 119 moves the head gimbal assemblies along radial arcs across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Referring still to FIG. 1, the disk pack and disks 115 (one shown) define an axis 140 of rotation 141 and radial directions 142, 143, relative to the axis 140. The drive 111 also has a bypass channel 150 formed in the housing 113 for directing the airflow 160 generated by rotation of the disks 115 from the upstream side of the disk pack or disks (e.g., proximate to radial direction 142 in FIG. 1) 115 to the downstream side of the disk pack or disks 115 (e.g., proximate to radial direction 143 in FIG. 1). In the embodiment shown, the bypass channel 150 is located between an outer perimeter 116 (FIG. 1) of the housing 113 and the actuator 121, such that the bypass channel 150 completely circumscribes the actuator 121. However, in embodiments of the present invention, a different configuration of bypass channel 150 can be implemented. Bypass channel 150 further comprises a first opening 151 proximate to upstream side wherein air is conveyed away from the disks 115 and a second opening 152 proximate to downstream side wherein airflow 160 is directed toward the disks 115. In embodiments of the present invention, bypass channel 150 exhibits low flow resistance to airflow 160.

The use of bypass channel 150 has several advantages, including the ability to reduce aerodynamic buffeting of actuator 121 during the servo writing process and/or during normal operation of disk drive system 111. More specifically, bypass channel 150 reduces the pressure build-up on the upstream side of actuator 121 which occurs when drive 111 is operated. Additionally, directing airflow 160 around the actuator 121 decreases the upstream pressure on the actuator, thus reducing force acting on the actuator 121 while reducing the energy of the bluff-body wake of the actuator arm.

Figure 2:
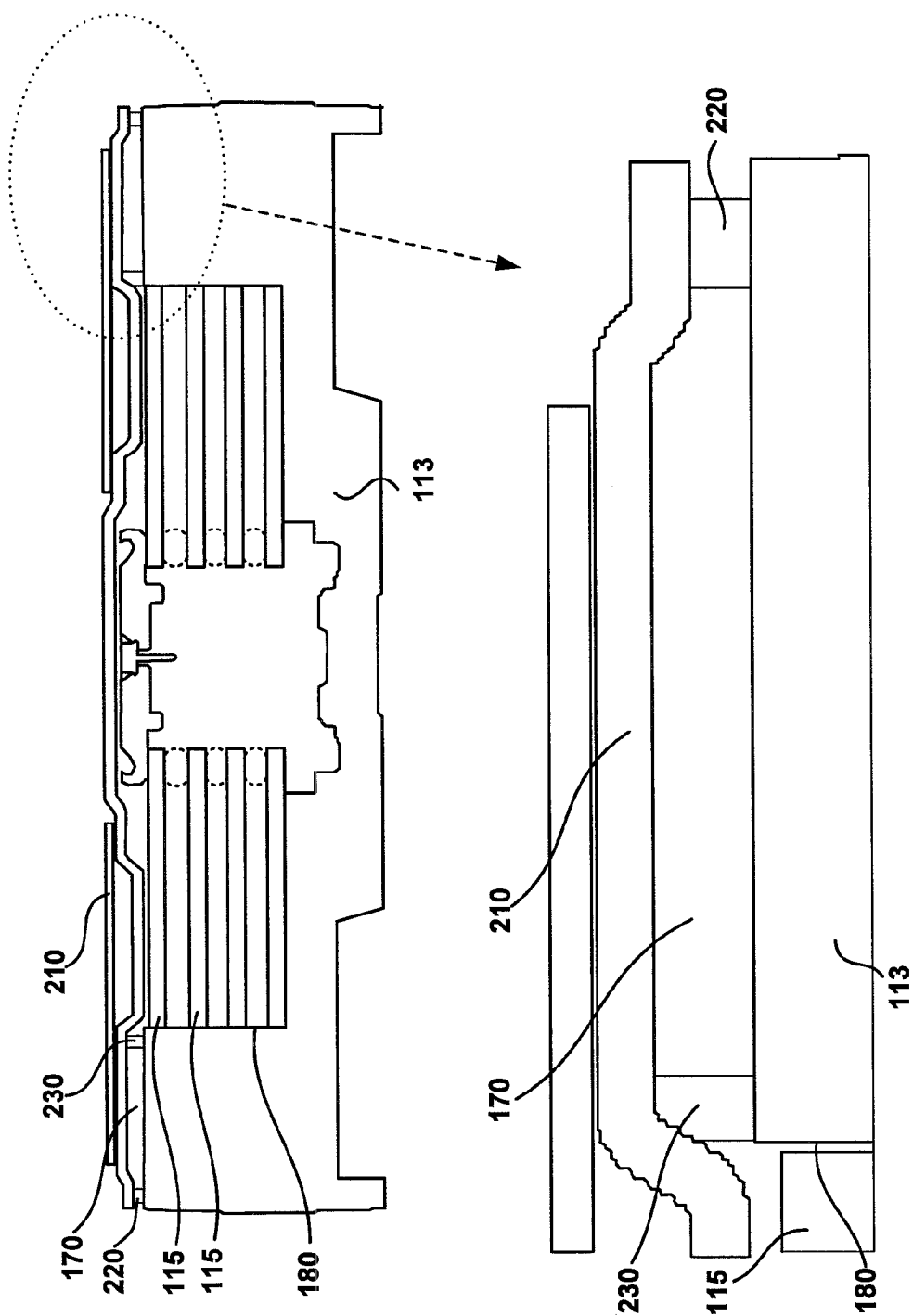
FIG. 2 illustrates an example of a cover of a HDD, in accordance with an embodiment of the present invention.
Figure 3:
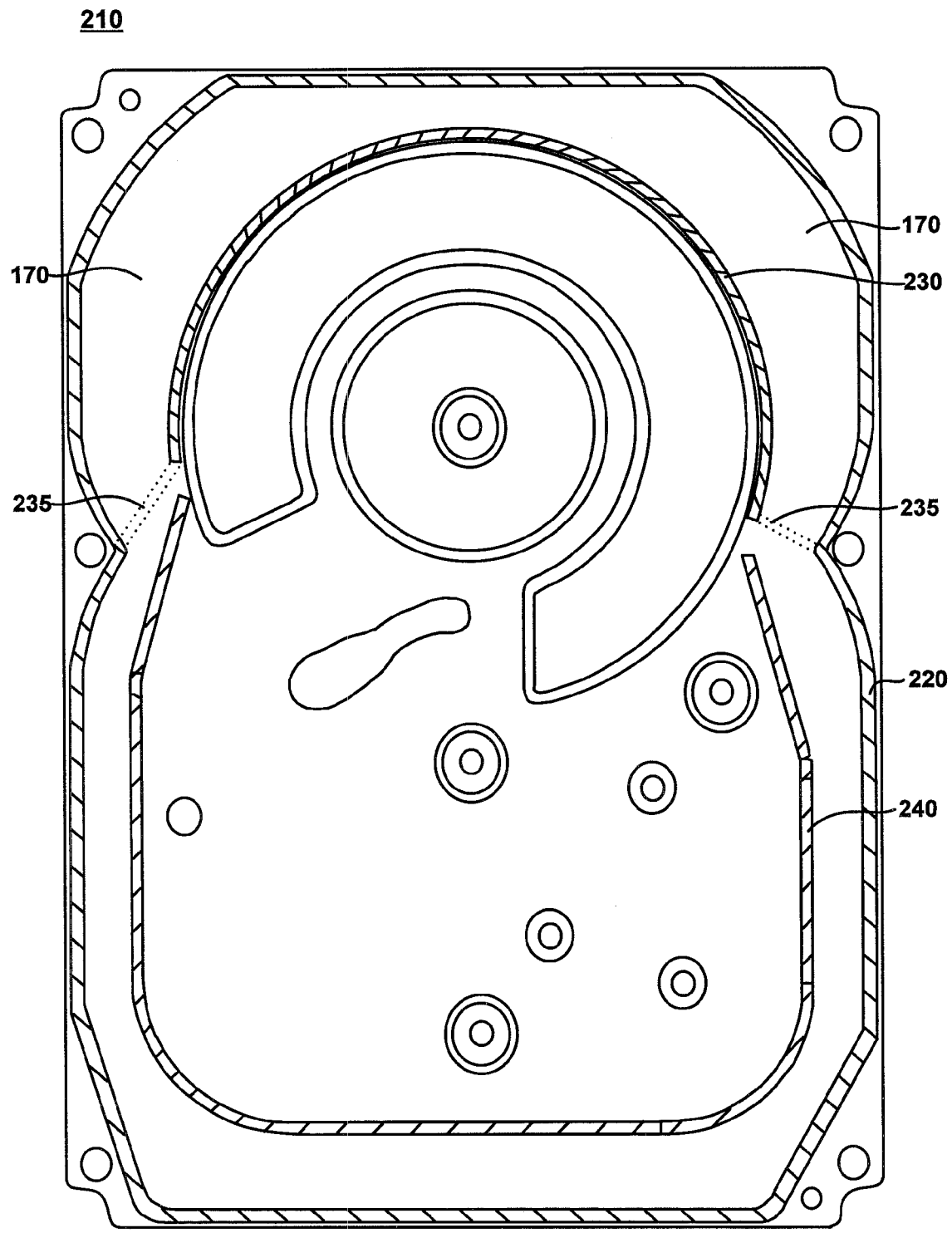
FIG. 3 illustrates an example of a cross-section of a HDD, in accordance with an embodiment of the present invention.

Referring to FIGS. 1-3, the airflow 160 exiting bypass channel 150 can enter into a reservoir 170 and cause an unstable air pressure (e.g., turbulence) in the reservoir. The bypass channel 150 is sealed with the cover 210 by external seal gasket 220 and channel gasket 240.

Reservoir 170 is bounded at least by base 113, cover 210, disk shroud 180 and external seal gasket 220. The airflow 160 entering reservoir 170 causes unstable air pressure to constantly be collected and pumped into reservoir 170. The unstable air pressure will tend to move towards a region of lower air pressure. If the region of the disk 115 has a lower air pressure than the unstable air pressure in the reservoir 170, then the unstable air in the reservoir will flow from the reservoir to the region of the disk 115, causing deleterious effects on the system. Examples of the deleterious effects can be but are not limited to increased forces on the actuator 121 and/or disk 115, flow instabilities causing vibration (e.g., disk flutter) and decreased bypass efficiency. It should be appreciated that the unstable air in the reservoir 170 will travel towards the disk 115 only if there is a passage way that sufficiently allows for the passage of air from the reservoir towards the disk 115.

In one embodiment, base plate 113 is raised towards the cover or top plate 210, locally at the reservoir 170, to isolate the unstable air pressure in the reservoir 170 from the disk 115. Accordingly, the clearance between the base plate 113 and cover 210 is minimized such that unstable air pressure in the reservoir is inhibited to flow from the reservoir 170 directly to disk 115. The clearance between the base plate 113 and the cover 210 can be less than or equal to 0.5 millimeters (mm). It should also be appreciated that the minimized clearance between base plate 113 and cover 210 prevents pressure build up in reservoir 170, which in turn helps bypass efficiency.

In another embodiment, cover 210 is lowered towards base plate 113, locally at the reservoir 170, to isolate the unstable air pressure in the reservoir 170 from the disk 115. Accordingly, the clearance between the base plate 113 and cover 210 is minimized such that unstable air pressure in the reservoir is inhibited to flow from the reservoir 170 directly to disk 115. The clearance between the base plate 113 and the cover 210 can be less than or equal to 0.5 millimeters (mm). It should also be appreciated that the minimized clearance between base plate 113 and 210 prevents pressure build up in reservoir 170, which in turn helps bypass efficiency.

In a further embodiment, a reservoir seal 230 is disposed between the cover 210 and the base plate 113 to isolate the unstable air pressure in the reservoir 170 from the disk 115. Reservoir seal 230 is disposed along the perimeter of the disk shroud 180 and also proximate along a periphery of disk 115. Reservoir seal 230 provides for a complete seal such that unstable air pressure in the reservoir is inhibited to flow from reservoir 170 directly to disk 115. In one embodiment, reservoir seal 230 is a form-in-place gasket (FIPG). It should be appreciated that any combination of (1) raising the base plate 113, (2) lowering the cover 210 and/or (3) disposing a reservoir seal 230, as described above, is utilized to isolate the disk 115 from the reservoir 170.

In one embodiment, HDD 111 does not include a bypass channel 150 and corresponding channel gasket 240. Conventional HDD design without a bypass channel 150 also allows unstable air originating from the down downstream side of the rotating disk 115 to enter into reservoir 170, as described above. Accordingly, any combination of (1) raising the base plate 113, (2) lowering the cover 210 and/or (3) disposing a reservoir seal 230, as described above, is utilized to isolate the disk 115 from the reservoir 170. Moreover, reservoir seal 230 extends along portion 235 and abuts or is integral with external seal gasket 220.

Figure 4:
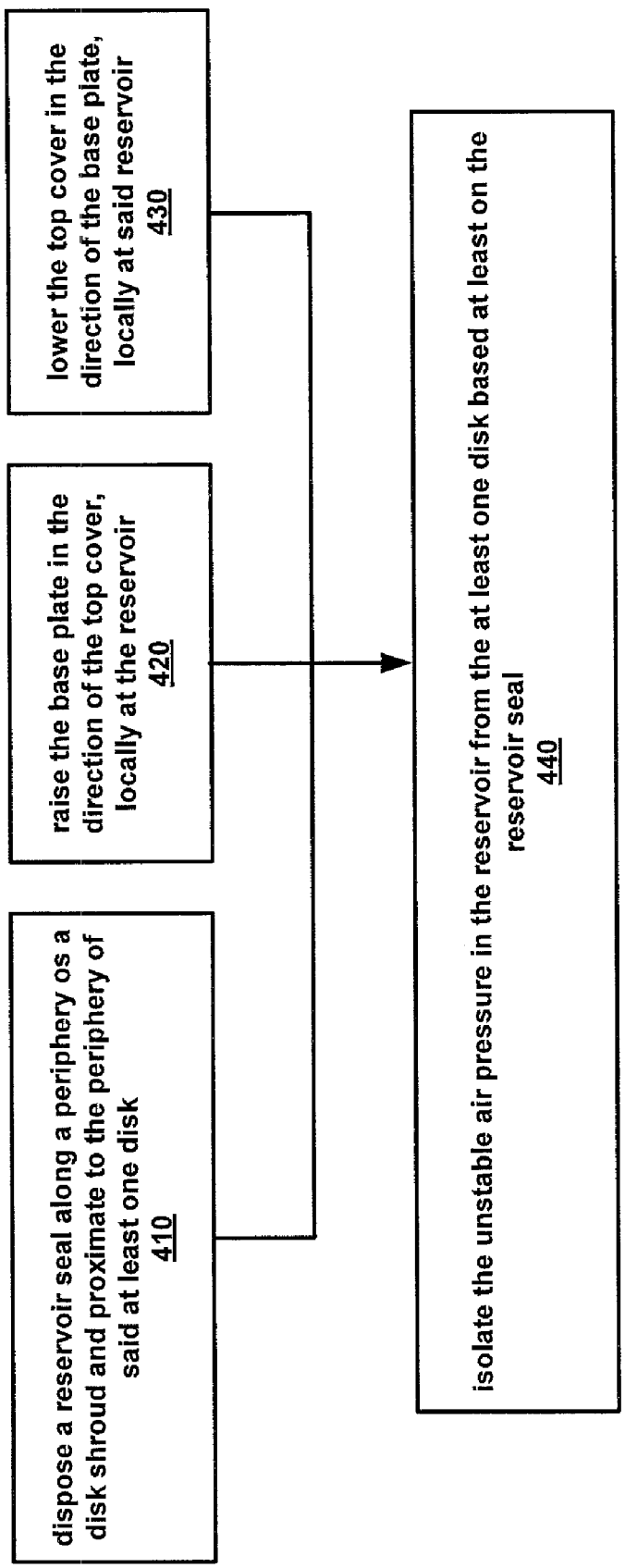
FIG. 4 illustrates an example of a flow chart of a method for isolating unstable air pressure in a HDD, in accordance with an embodiment of the present invention.

FIG. 4 depicts a method 400 for isolating unstable air pressure in a hard disk drive, in accordance with an embodiment of the present invention. In one embodiment, method 400 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, method 400 is performed at least by the system of FIGS. 1-3.

At step 410, of method 400, a reservoir seal is disposed along a periphery of a disk shroud and proximate to the periphery of said at least one disk. In another embodiment, at step 420, the base plate is raised in the direction of said top cover, locally at the reservoir. In a further embodiment, at step 430, the top cover is lowered in the direction of the base plate, locally at said reservoir.

At step 440, the unstable air pressure in the reservoir is isolated from the at least one disk based at least on the reservoir seal. It should be appreciated that any combination of (1) raising the base plate, at step 420, (2) lowering the cover, at step 430 and/or (3) disposing a reservoir seat, at step 410, as described above, is utilized to isolate the disk from the reservoir.

Various embodiments of the present invention are thus described. While the present invention has been described in particular embodiments, it should be appreciated that the present invention should not be construed as limited by such embodiments, but rather construed according to the following claims.

The invention claimed is:

1. A hard disk drive comprising:
   a base plate, wherein said base plate comprises a disk housing;
   at least one disk located within a disk shroud in said base plate;
   a drive cover, wherein said drive cover is configured to cover said at least one disk within said base plate;
   a reservoir between said base plate and said drive cover, wherein said reservoir is proximate along a periphery of said at least one disk; and
   a reservoir seal configured to isolate unstable air pressure in said reservoir from said at least one disk, configured to inhibit unstable air pressure from flowing from said reservoir to said at least one disk, configured to provide for a complete seal such that unstable air pressure in said reservoir is inhibited to flow from said reservoir directly to said at least one disk, and configured to abut or be integral with both ends of an external seal gasket of the hard disk drive.

2. The disk drive of claim 1, wherein said reservoir seal is disposed along a periphery of said disk shroud and proximate to said periphery of said at least one disk.

3. The disk drive of claim 1, wherein said reservoir seal comprises:
   form-in-place gasket (FIPG).

4. The disk drive of claim 1, wherein said reservoir seal is seated between said base plate and said drive cover.

5. The disk drive of claim 1, comprising:
   a bypass channel for directing airflow from a downstream side of said at least one disk to an upstream side of said at least one disk, wherein said unstable air pressure enters said reservoir from said upstream side of said at least one disk.

6. The disk drive of claim 1, comprising:
a clearance between said drive cover and said base plate, wherein said clearance is less than or equal to 0.5 millimeters (mm).

7. A hard disk drive comprising:
a base plate, wherein said base plate comprises a disk housing;
at least one disk located within a disk shroud in said base plate, wherein said at least one disk produces unstable air pressure;
a drive cover, wherein said drive cover is configured to cover said at least one disk within said base plate;
a reservoir between said base plate and said drive cover and proximate along a periphery of said at least one disk, wherein said reservoir is configured to isolate said unstable air pressure in said reservoir from said at least one disk and configured to inhibit unstable air pressure from flowing from said reservoir to said at least one disk;
a reservoir seal configured to provide for a complete seal such that unstable air pressure in said reservoir is inhibited to flow from said reservoir directly to said at least one disk, and configured to abut or be integral with both ends of an external seal gasket of the hard disk drive; and
a clearance between said drive cover and said base plate, wherein said clearance is less than or equal to 0.5 millimeters (mm).

8. The disk drive of claim 7,
wherein said reservoir seal is configured to isolate said unstable air pressure in said reservoir from said at least one disk.

9. The disk drive of claim 7, comprising:
a bypass channel for directing airflow from a downstream side of said at least one disk to an upstream side of said at least one disk, wherein said unstable air pressure enters said reservoir from said upstream side of said at least one disk.

10. A method for isolating unstable air pressure in a hard disk drive, wherein said hard disk drive comprises a reservoir between a base plate and a top cover, wherein said reservoir is proximate a periphery of at least one disk and a disk shroud, said method comprising:
disposing a reservoir seal along a periphery of said disk shroud and proximate to said periphery of said at least one disk;
isolating said unstable air pressure in said reservoir from said at least one disk based at least on said reservoir seal;
inhibiting unstable air pressure from flowing from said reservoir to said at least one disk; and
wherein said reservoir seal is configured to provide for a complete seal such that unstable air pressure in said reservoir is inhibited to flow from said reservoir directly to said at least one disk, and is configured to abut or be integral with both ends of an external seal gasket of the hard disk drive.

11. The method of claim 10, further comprising:
said unstable air pressure entering said reservoir from an upstream side of said at least one disk.

12. The method of claim 10, comprising:
decreasing a clearance of said reservoir, wherein said clearance between said top cover and said base plate is less than or equal to 0.5 millimeters.

13. The method of claim 12, wherein said decreasing of said clearance of said reservoir comprises:
raising said base plate in the direction of said top cover, locally at said reservoir.

14. The method of claim 12, wherein said decreasing of said clearance of said reservoir comprises:
lowering said top cover in the direction of said base plate, locally at said reservoir.

15. The method of claim 10, further comprising:
said unstable air pressure entering said reservoir from an exit of a bypass channel.

\* \* \* \* \*